(12) United States Patent
Hamaker et al.

(10) Patent No.: US 10,540,133 B2
(45) Date of Patent: Jan. 21, 2020

(54) MANAGING DISPLAY DATA OF DIFFERENT TYPES FOR TRANSMISSION TO MULTIPLE DEVICES

(71) Applicants: Eric Kenneth Hamaker, Cambridge (GB); Colin Skinner, Cambridge (GB)

(72) Inventors: Eric Kenneth Hamaker, Cambridge (GB); Colin Skinner, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 15/570,305

(22) PCT Filed: Apr. 12, 2016

(86) PCT No.: PCT/GB2016/051024
§ 371 (c)(1),
(2) Date: Oct. 27, 2017

(87) PCT Pub. No.: WO2016/174392
PCT Pub. Date: Nov. 3, 2016

(65) Prior Publication Data
US 2018/0136892 A1    May 17, 2018

(30) Foreign Application Priority Data

Apr. 30, 2015  (GB) .................................. 1507429.7

(51) Int. Cl.
*G06F 3/14* (2006.01)
*G09G 5/00* (2006.01)
*G09G 5/377* (2006.01)

(52) U.S. Cl.
CPC ........... *G06F 3/1431* (2013.01); *G09G 5/001* (2013.01); *G09G 5/003* (2013.01); *G09G 5/377* (2013.01); *G09G 2310/08* (2013.01); *G09G 2340/12* (2013.01); *G09G 2360/04* (2013.01); *G09G 2360/12* (2013.01); *G09G 2360/18* (2013.01)

(58) Field of Classification Search
CPC .................................................... G06F 3/1431
See application file for complete search history.

(56) References Cited

U.S. PATENT DOCUMENTS 5,576,769 A * 11/1996 Lendaro .................. H04N 5/45
                                                             348/511
6,449,702 B1 * 9/2002 Witter ................. G06F 13/1642
                                                             711/151
(Continued)

*Primary Examiner* — Barry Drennan
*Assistant Examiner* — Terrell M Robinson
(74) *Attorney, Agent, or Firm* — Haynes and Boone, LLP

(57) ABSTRACT

Display data of a first type for a first display device is fetched from a first portion of a first buffer memory and display data of a second type is fetched from a first portion of a second buffer memory at a first time according to an arbitration control signal and then combined into display data for the first display device. Display data of the first type for the second display device is fetched from a second portion of the first buffer memory and display data of the second type for the second display device is fetched from a second portion of the second buffer memory at a second time according to the arbitration control signal, and then combined into display data for the second display device, which is multiplexed with the combined display data for the first display device into a single display data stream and output.

19 Claims, 5 Drawing Sheets

(56) References Cited

U.S. PATENT DOCUMENTS

| | | | |
|---|---|---|---|
| 7,477,205 B1 | 1/2009 | de Waal et al. | |
| 2002/0093590 A1* | 7/2002 | Hodgkiss | H04N 5/073 348/500 |
| 2003/0137528 A1* | 7/2003 | Wasserman | G06F 3/1431 715/700 |
| 2003/0212811 A1* | 11/2003 | Thornton | G06F 3/1431 709/231 |
| 2004/0141526 A1* | 7/2004 | Balasubramanian | H04J 3/0667 370/503 |
| 2004/0222941 A1 | 11/2004 | Wong et al. | |
| 2005/0174354 A1* | 8/2005 | Doyle | G06F 3/1431 345/543 |
| 2008/0074544 A1* | 3/2008 | Cappaert | G09G 5/008 348/537 |
| 2008/0297511 A1* | 12/2008 | Chou | G09G 5/005 345/428 |
| 2011/0013650 A1* | 1/2011 | McElvain | G06F 17/5045 370/503 |
| 2012/0169745 A1 | 7/2012 | Carter et al. | |
| 2012/0188261 A1 | 7/2012 | Riach et al. | |
| 2018/0234496 A1* | 8/2018 | Ratias | H04L 67/22 |

* cited by examiner

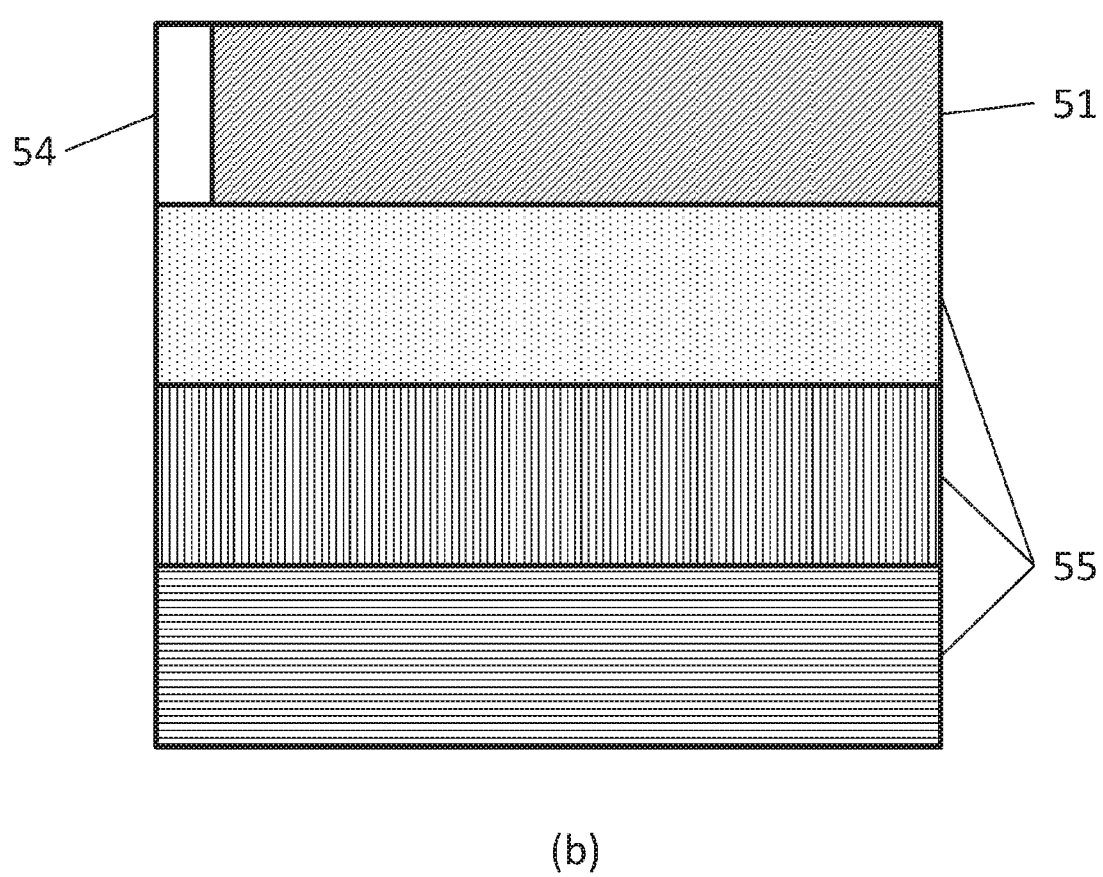
Figure 5

MANAGING DISPLAY DATA OF DIFFERENT TYPES FOR TRANSMISSION TO MULTIPLE DEVICES

RELATED APPLICATIONS

This application is a U.S. National Stage patent application of International Patent Application No. PCT/GB2016/051024 (filed on Apr. 12, 2016), the benefit of which is claimed, and claims priority to Great Britain Patent Application No. 1507429.7 entitled "Managing Display Data," which was filed Apr. 30, 2015, each of which is hereby incorporated by reference in their entirety.

TECHNICAL FIELD

The present invention relates to a method and apparatus for managing display data, especially, though not exclusively to a video display controller for transferring display data from a plurality of display data sources to a plurality of display devices.

BACKGROUND

In desktop computing, it is now common to use more than one display device such as a monitor, television screen or even a projector. Traditionally, a user would have a computing device with a single display device attached, but now it is possible to have more than one display device attached to the computer, which increases the usable area for the worker. For example, International Patent Application Publication WO 20071020408 discloses a display system which comprises a plurality of display devices, each displaying respectively an image; a data processing device connected to each display device and controlling the image displayed by each display device; and a user interface device connected to the data processing device. Connecting multiple display devices to a computer is a proven method for improving productivity. A computer supplying display data to one or more display devices is commonly called a host.

After the display data has been generated by the host, it is sent to one of a plurality of frame buffers. In general, a different frame buffer is used for each different type of display data, for example, image data and video overlay data. The display data from each of these frame buffers is fetched by a dedicated video display controller which performs blending of the different types of display data and, optionally, mapping and/or transformational functions before supplying the processed display data to the display device. The mapping functions may include dithering, which is the application of noise to randomise errors caused by processing in order to minimise the appearance of visual artefacts such as banding, and scaling of the image to be displayed so that it fits appropriately on the connected display device. Transformational functions, such as flipping, mirroring, rotating or other transformations may also be applied where image data is being supplied to the display device via an unusual input or the display device is in an unusual orientation. The video display controller may optionally also perform compression.

Conventionally, a video display controller is arranged in hardware such that there is one video display controller per display device output. This limits the number of display devices that can be connected to a host. On the other hand, providing multiple video display controllers in order to allow multiple display devices to be connected, leads to wasted resources as they may not all be used, and even if all the video display controllers are connected to display devices, it is unlikely that they will all be used to their full capacity.

Thus, it is desirable to overcome, or at least reduce, the disadvantages of the prior art noted above.

SUMMARY

According to a first aspect of the invention, there is provided a method of providing display data for at least first and second display devices of a plurality of display devices from a plurality of display data sources, the method comprising: fetching display data of a first type destined for the first display device from a first portion of a first buffer memory and display data of a second type destined for the first display device from a first portion of a second buffer memory at a first time according to an arbitration control signal, the first buffer memory having stored therein respective display data of the first type for respective display devices in respective portions thereof and the second buffer memory having stored therein respective display data of the second type for respective display devices in respective portions thereof; combining, by a first combining engine, the fetched display data of the first and second types destined for the first display device into combined display data destined for display on the first display device; fetching display data of the first type destined for the second display device from a second portion of the first buffer memory and display data of the second type destined for the second display device from a second portion of the second buffer memory at a second time, different to the first time, according to the arbitration control signal; combining, by the first combining engine, the fetched display data of the first and second types destined for the second display device into combined display data destined for display on the second display device; time multiplexing the combined display data destined for the first display device with the combined display data for the second display device into a single display data stream; and outputting the single display data stream.

This is beneficial because, unlike the known systems, this method only requires one set of hardware to serve multiple external display devices to provide a single time-multiplexed display signal path. This is cheaper to implement and occupies a smaller area in an integrated circuit. It is also more flexible because the number of display devices that can be served is only limited by bandwidth and the time required for the combination of inputs to take place. This number can also be greatly increased if the display devices support variable frame rate. If there are fewer display devices than the maximum, there are no wasted resources, as compared to the conventional systems, where unused video display controllers are idle.

In one embodiment, the method further comprises storing the combined display data for the first display device in a first portion of an output buffer memory prior to the time multiplexing, and storing the combined display data for the second display device in a second portion of the output buffer memory prior to the time multiplexing.

In an embodiment, the method may further comprise: fetching cursor display data destined for the first display device from a first portion of a cursor buffer memory at a first predetermined time according to the arbitration control signal, the cursor buffer memory having stored therein respective cursor display data for respective display devices in respective portions thereof; combining, by a second combining engine, the fetched cursor display data destined for the first display device with the combined display data destined for display on the first display device into cursor combined display data destined for display on the first display device.

The method may also further comprise: fetching cursor display data destined for the second display device from a second portion of the cursor buffer memory at a second predetermined time according to the arbitration control signal; combining, by the second combining engine, the fetched cursor display data destined for the second display device with the combined display data destined for the second display device into cursor combined display data destined for display on the second display device.

The first predetermined time may be the same as the first time, and the second predetermined time may be the same as the second time. This is beneficial because in the case of a desktop image it is likely that the cursor will be the only thing moving while the rest of the image remains static. The provision of this method means that the cursor can be added to a frame that has already been created, which makes it unnecessary to recreate a frame that is identical to the previous frame except in the position of the cursor. This is more efficient in terms of both time and energy and reduces the number of memory interactions required.

The first predetermined time may be the same as the first time, and the second predetermined time may be the same as the second time.

In an embodiment, the cursor buffer memory is part of a common memory with the buffer memories, so that a dedicated buffer does not need to be supplied just for the cursor, which will reduce the size and cost of an integrated circuit. Furthermore, the use of a common memory means that the size of the cursor can be more flexible and no space would be wasted, whereas a dedicated cursor buffer would need to be sized in order to allow for the maximum possible size of cursor and in the majority of cases this space would not all be used. In this embodiment, the use of a common memory means that space not needed for cursor data can be used for other purposes.

A further benefit of this embodiment is that it allows different sections of the stored cursor data to be used to produce multiple cursor streams, allowing different parts of the cursor to appear seamlessly on different display devices. This is especially useful where multiple display devices have been combined such that they appear to the user to be a single display device; this method allows the cursor to move seamlessly between display devices.

There may be more than one cursor or cursor stream, but for clarity, the embodiments described herein will refer to one cursor only. This does not limit or dictate the scope of the claims.

In an embodiment, the method further comprises processing the combined data and/or the cursor combined data prior to the time multiplexing.

In one embodiment, the processing of the combined data or the cursor combined data comprises any one or more of: flipping, mirroring, rotating, dithering, blending, colour correcting, scaling or other transformations of the display data; mapping the display data according to requirements of the particular display device for which the display data is destined; compressing; and converting into a display specific protocol format for the particular display device for which the display data is destined.

The single display data stream may be demultiplexed into separate display data streams, each separate display data stream being passed to a particular display device. This is beneficial because it will allow the video display controller to interface with display devices that may expect to interface with multiple individual video display controllers.

Alternatively, the single display data stream may be passed to all the display devices, each display device only displaying the display data destined for that display device. This would be beneficial because it will reduce connection complexity by allowing either many copies of the controller that interfaces with an external display, such as an HDMI controller (hereinafter known as an output interface), or a single output interface supporting multiple streams to be connected to a computer through a single cable. This will also take advantage of the fact that the display output is being produced by a single engine.

In one embodiment, the arbitration control signal may be generated by: generating a virtual clock signal for each particular display device, by: receiving a local clock signal, wherein the local clock signal has a frequency that is a, or a multiple of a, sum of the clock frequencies required for the plurality of display devices; fetching ratio information for the particular display device indicating a ratio between the clock frequency required for the particular display device and the local clock signal; counting a fraction of the local clock signal based on the ratio information; and outputting the virtual clock signal when the count reaches an integer value, using the virtual clock signal by: generating a horizontal synchronisation signal to be used to horizontally synchronise the display data on the particular display device; generating a vertical synchronisation signal to be used to vertically synchronise the display date on the particular display device; and generating an active pixel signal indicating that the display device includes a pixel value to be output, wherein the active pixel signal is used to increment an active pixel accumulator for the particular display device; and generating the arbitration control signal based on the accumulation totals of each of the active pixel accumulators.

As an example of the components of each virtual clock signal, if there are three display devices, two of which have a clock frequency of 4 Hz while the third has a clock frequency of 8 Hz, these frequencies will be added to produce a local clock signal at a frequency of 16 Hz. The ratio values stored for the three display devices will be ¼ for the two display devices with clock frequencies of 4 Hz and ½ for the display device with a frequency of 8 Hz.

This is beneficial because it allows the video display controller to supply display data to all connected displays from all available sources in a manner that ensures that the display devices all receive sufficient display data in time for them to update the images displayed, but only one actual local clock need be provided.

In one embodiment, the accumulation total of a particular active pixel accumulator is reset when display data destined for the particular display device is fetched from a buffer memory based on the arbitration control signal.

The method may further comprise: inputting display data of the first type into the first portion of the first buffer memory from a first source of display data of the first type destined for the first display device, and inputting display data of the first type into the second portion of the first buffer memory from a second source of display data of the first type destined for the second display device, each of the sources of display data of the first type having display data of the first type destined for one of the display devices; and inputting display data of the second type into the first portion of the second buffer memory from a first source of display data of the second type destined for the first display device, and inputting display data of the second type into the second portion of the second buffer memory from a second source of display data of the second type destined for the second display device, each of the sources of display data of the second type having display data of the second type destined for one of the display devices.

The method may comprise decompressing the display data prior to inputting it into a buffer memory if a source of the display data provides it in compressed form.

In one embodiment, the first type of display data comprises image data and/or the second type of display data comprises video overlay data.

A second aspect of the invention provides a video display controller configured to perform a method as described above. In one embodiment, the video display controller is embodied as a fixed-function hardware processor. This is beneficial because hardware processors are commonly faster and will use less power than general-purpose programmable processors such as CPUs.

In one embodiment, there is only one output arranged to carry all the streams of display data in an interleaved manner as described above.

Advantageously, there may be further provided a device connected to the input of the video display controller and arranged to decompress streams of display data that have been supplied in compressed form. This may be because the data has been supplied by a transport method with limited bandwidth such as USB or because it has been stored in memory in a compressed form.

Advantageously, there may be provided a device connected to the output or outputs of the video display controller and arranged to compress the display data that has been processed by the video display controller prior to it being sent to the one or more display devices.

In one embodiment, the video display controller may further be arranged to split the single multiplexed stream into multiple streams of pixel data, one for each display device, and further comprise:
1. a demultiplexer arranged to direct display data to one or more output streams
2. one or more buffers in which processed display data can be stored, where there is one buffer per outgoing display stream.
3. one or more outputs for display data.

The provision of this additional functionality is beneficial because it will allow the video display controller to interface with current-art display interfaces that will expect pixel data in one or more separate streams depending on the number of display devices.

In one embodiment, there may further be provided a timing block connected to each of the said buffers, each arranged to control data reads from its respective buffer. In one embodiment, this function is served by the main timing block of the video display controller.

In one embodiment, the output buffers are comprised in a single part of memory that is subdivided as appropriate, depending on the number of outgoing streams.

In one embodiment, both sets of buffers may be comprised in a single part of memory that is itself subdivided to form the two sets of buffers.

The use of a single memory for these processes is beneficial because it reduces the number of separate areas of memory that must be provided and allows more flexible and efficient use of that memory. This reduces cost and wasted space on the chip.

BRIEF DESCRIPTION OF THE DRAWINGS

One or more embodiments of the invention will now be more fully described, by way of example, with reference to the drawings, of which:

FIGS. 5a and 5b are representations of different means of storing cursor and display data according to one embodiment.

DETAILED DESCRIPTION

Figure 1:
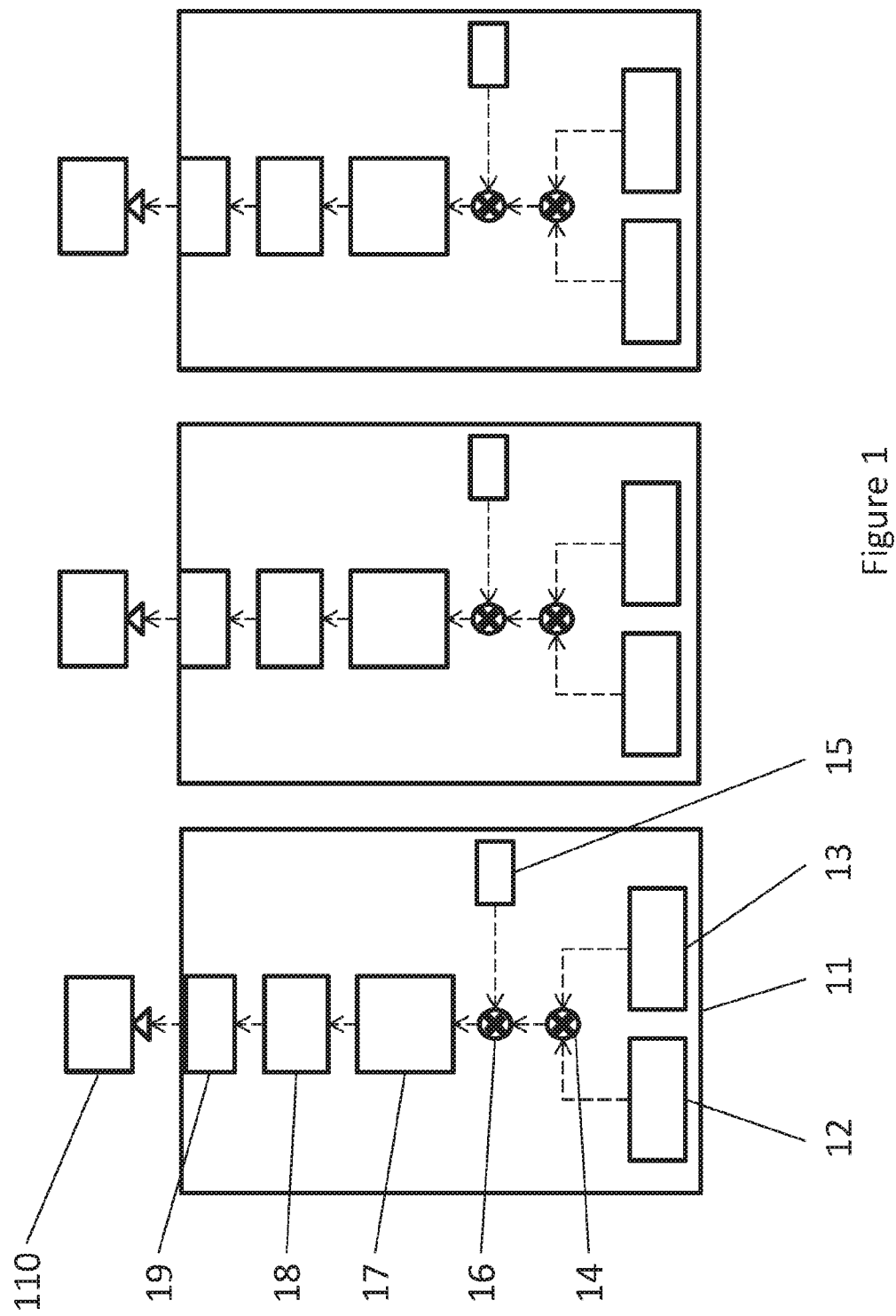
FIG. 1 is a schematic diagram of a known video display controller.

FIG. 1 shows the known way of arranging video pipes for multiple (in this case, three) display devices [110] by having multiple (in this case, three) individual video display controllers [11], each video display controller [11] being arranged to provide display data to one display device [110]. The video display controllers [11] are identical and as such only one is labelled for clarity. As previously mentioned, this duplication is necessary in order to connect multiple display devices [110]. Each video display controller [11] is supplied from a single frame buffer [12] which holds the image display data, and a single video buffer [13] which holds video overlay. Between them, these buffers [12, 13] hold the display data to be processed by the video display controller and output to the display device [110]. They are blended by a first blending (or combining) engine [14] in order to form a single plane of display data, which is then combined, if appropriate, with cursor data from a cursor buffer [15] by a cursor blending (or combining) engine [16]. Any processing or mapping is then carried out by a processor [17]. If desired, the processed display data is then compressed in a compression unit [18] and converted to a display-specific format such as VGA or HDMI in an output unit [19]. The output from the video controller provides an output stream solely for the connected display device [110].

Figure 2:
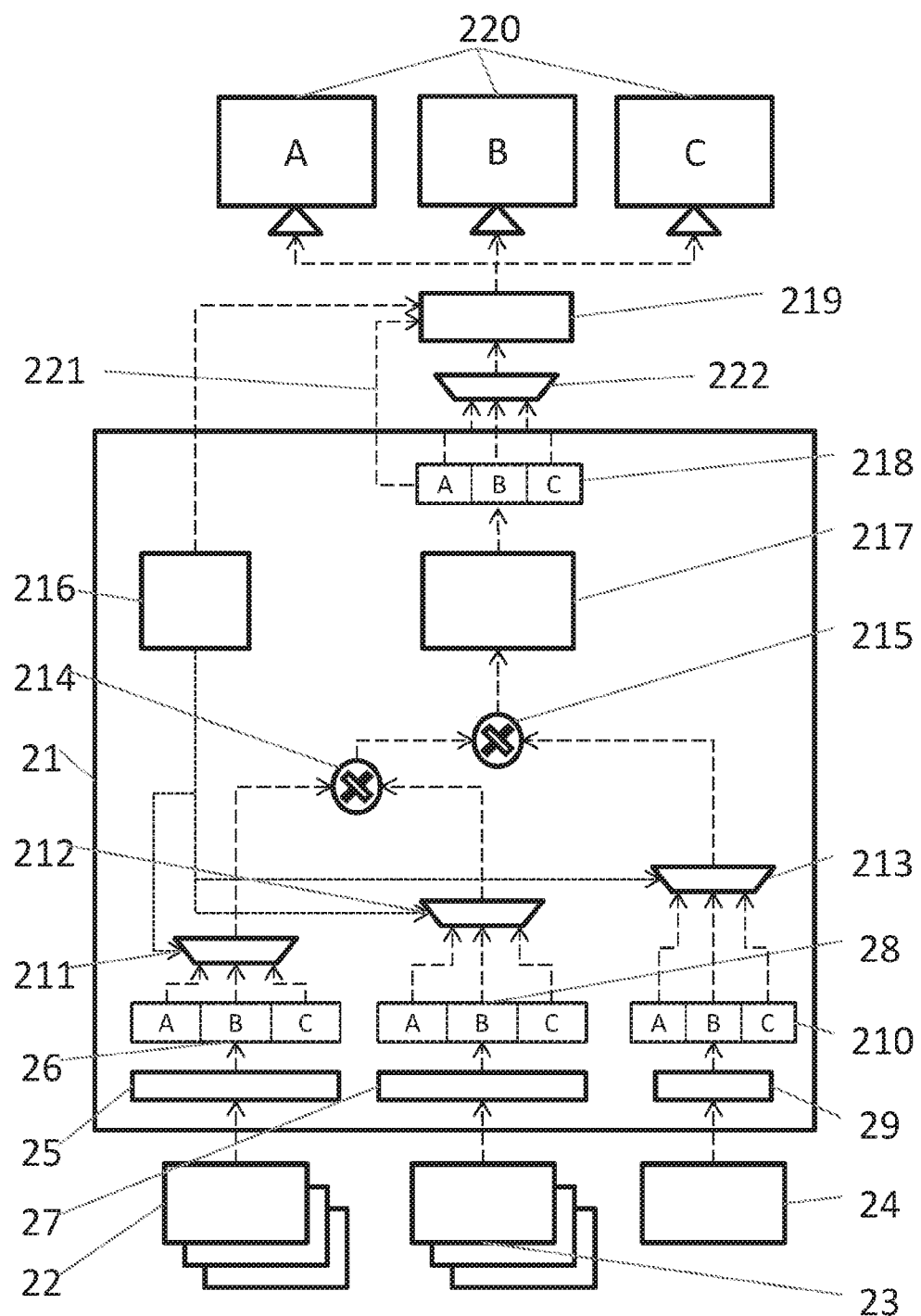
FIG. 2 is a schematic diagram of a video display controller according to an embodiment of the invention.

FIG. 2 illustrates, schematically, a video display controller [21] according to an embodiment of the invention. In this embodiment, the video display controller [21] takes image data and video overlay as input. Unlike the known system, however, it is capable of taking input from multiple system frame buffers [22] and video buffers [23] in a multiplexed manner. Each type of data is input into internal buffers [26, 28] by a respective refill engine [25, 27] from the frame buffer sources [22, 23]. The internal buffers [26, 28] are each divided into one or more virtual FIFOs, one per connected display device [220]. The virtual FIFOs and the connected display devices [220] are each labelled A, B, C such that image data destined for the display device labelled A [220A] is placed into the virtual FIFO labelled A [26A] and likewise for the virtual FIFOs in the video overlay [28A] and cursor [210A] buffers. Display data of each type is then fetched from the FIFO of each internal buffer [26, 28] via multiplexers [211, 212] to a first combining engine [214] where the display data is initially blended. Thus, image display data destined for a first display device [220A] is stored in a first FIFO [A] of a first internal buffer [26], image display data destined for a second display device [220B] is stored in a second FIFO [B] of the first internal buffer [26] and image display data destined for the third display device [220C] is stored in a third FIFO [C] of the first internal buffer [26]. When controlled to do so, as will be more fully explained below, the image display data destined for the first display device [220A] is fetched from the first FIFO [A] of the first internal buffer [26] via multiplexer [211] to first combining engine [214].

Similarly, video overlay display data destined for the first display device [220A] is stored in a first FIFO [A] of a second internal buffer [28], video overlay display data destined for the second display device [220B] is stored in a second FIFO [B] of the second internal buffer [28] and video overlay display data destined for the third display device [220C] is stored in a third FIFO [C] of the second internal buffer [28]. When controlled to do so, as will be more fully explained below, the video overlay display data destined for the first display device [220A] is fetched from the first FIFO [A] of the second internal buffer [28] via multiplexer [212] to first combining engine [214].

There is also an external cursor buffer [24], which holds all the image data comprising the cursor icon currently in use. Cursor data is input by a cursor refill engine [29] into an internal cursor buffer [210] which may be divided into virtual FIFOs in the same way as the other internal buffers and fetched for blending with the combined display data through a cursor blending engine [215] via its own multiplexer [213]. The resulting cursor combined data can then be sent to a processor [217] for any processing or mapping, and, if desired, compression and conversion to a display-specific format such as VGA or HDMI. The processed display data for each display device is stored in appropriate parts of an output buffer [218], from which the display data is passed via multiplexer [222] to an output unit [219], where the display data for the different display devices is interleaved to form a single stream which may be sent to the display devices [220].

In this embodiment, the output stream does not have to be split for the benefit of a subsequent component but is sent in an interleaved form to the display devices [220]. Once produced, the interleaved stream could, for example, be displayed on the appropriate display devices [220] according to an addressing system such that each display device [220] ignores packets not addressed to it. In an alternative example, there could be a demultiplexer provided at the display end of the connection which uses an addressing system to direct packets to the display device [220] to which they are addressed.

As mentioned above, the image display data is fetched from a virtual FIFO of the first internal buffer [26] via multiplexer [211] to the first combining engine [214], where it is blended (combined) with the video overlay display data fetched from a virtual FIFO of the second internal buffer [28] via multiplexer [212]. The fetching is controlled by an arbitration control signal from a control unit [216], which determines which display data for which display device is to be fetched at any particular time.

Figure 3:
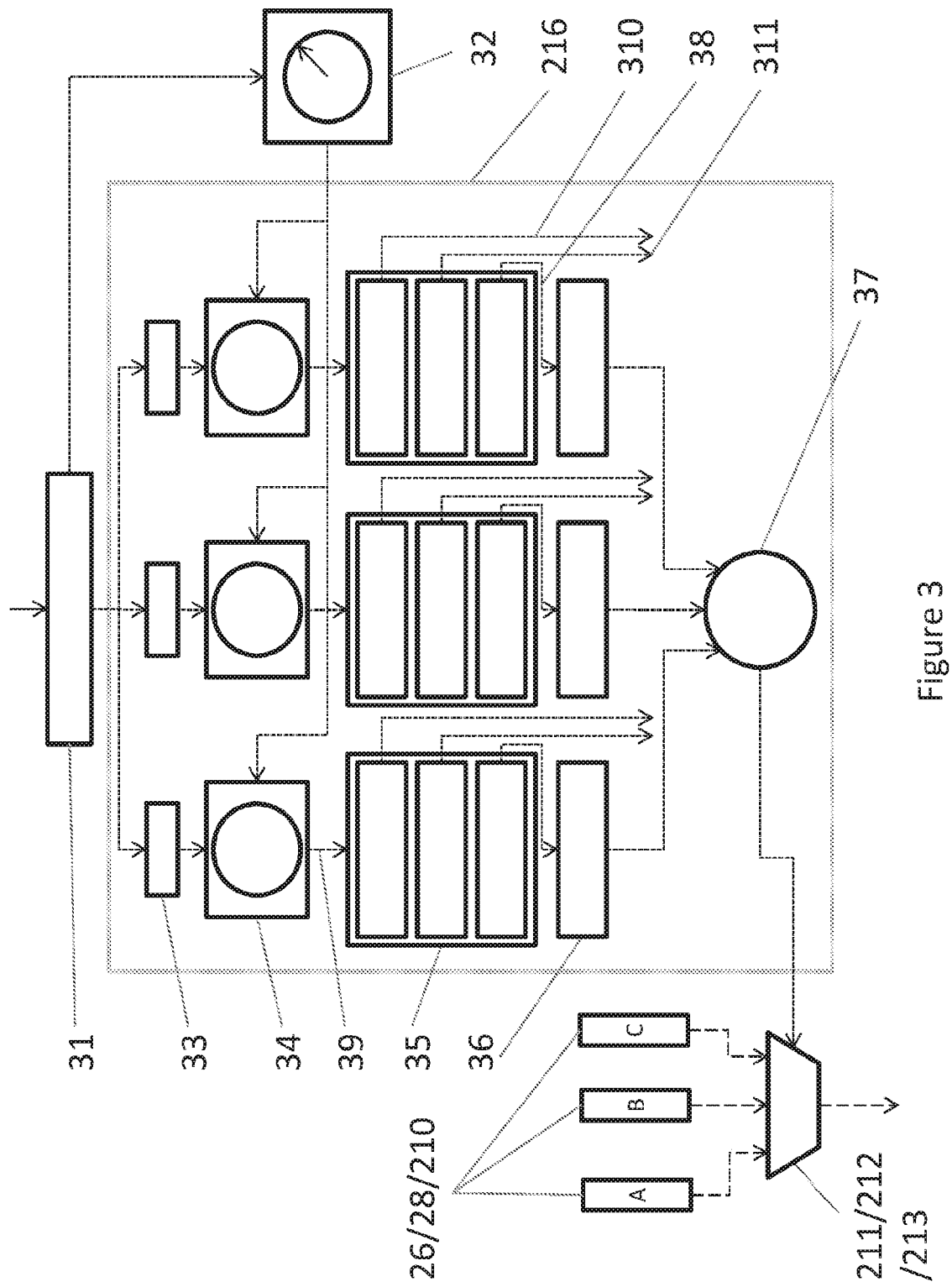
FIG. 3 is a schematic diagram of an arbitration system used in the video display controller of FIG. 2 according to one embodiment.

FIG. 3 shows the details of an arbitration system formed within the control unit [216] and the multiplexers [211, 212, 213] according to one embodiment. The arbitration system comprises a virtual clock signal generator for each display device. Each virtual clock generator is formed by a fraction register [33] and a fractional counter [34]. The virtual clock signal is used by a timing block [35] to generate an active pixel signal which increments an accumulator [36]. All the accumulators [36] provide their totals to a single arbitrator [37], which supplies a control signal to the multiplexers [211, 212, 213] to control which of the virtual FIFOs from the internal buffers [26, 28, 210] supply display data to the combining engines [214, 215] for blending. The same control signal is sent to each multiplexer [211, 212, 213] and as such only one multiplexer [211, 212, 213] and internal buffer [26, 28, 210] is shown.

In this embodiment, a firmware block [31], which is external to the video display controller [21], receives device information from each of the connected display devices [220], including the frequency at which each one can receive and refresh data. The firmware block [31] sums the refresh frequencies for all the display devices and programs a local clock [32] to run at this frequency. The firmware block [31] also calculates a ratio value for each display device [220] between the refresh frequency for that display device and the frequency of the local clock [32] and stores these ratio values in the fraction registers [33]. The firmware block [31] only needs to perform these actions when the system is initializing or when a display device is connected or disconnected.

Each fractional counter [34] takes inputs from the local clock [32] and from its respective fraction register [33] to create a virtual clock signal [39] for each display device [220]. In this embodiment, the fractional counter [34] takes the ratio value from its associated fraction register [33] on every tick of the local clock [32] and adds it to a running total. When the total reaches one (or another specified value), the fractional counter [34] outputs a virtual clock tick [39] and resets the total to zero. For example, if the ratio stored in the fraction register [33] associated with a particular display device [220] is ¼, the associated fractional counter [34] will output a virtual clock tick [39] every four actual clock ticks (¼+¼+¼+¼=1). A display device [220] with a higher resolution can therefore have a higher-rate virtual clock [39] and similarly for a display device [220] with a low resolution, but only one appropriately-configured local clock [32] is required. The fractional counter [34] then passes these virtual clock signals [39] to the respective timing block [35].

The timing block [35] contains counters which count up to values provided by the connected display devices [220] in order to produce Horizontal and Vertical synchronisation signals [310, 311]. These are used by the output interface [219] to correctly interleave outgoing display data. A third counter in the timing block [35] produces the active pixel signal [38], which indicates whether or not a pixel should be output to the display device [220] associated with this stream.

Each active pixel signal [38] is sent to the respective accumulator [36]. Each accumulator [36] comprises a counter which is incremented every time it receives an active pixel signal [38]. At regular intervals (for example, every three ticks of the local clock [32]) the arbitrator [37] checks which accumulator [36] has the highest count; this indicates that the associated display device [220] is expecting the highest number of pixels. The arbitrator [37] then decrements that accumulator [36] by a pre-programmed constant and signals to the multiplexers [211, 212, 213] to allow data from the appropriate virtual FIFO to be fetched and passed to the appropriate combining engine [214, 215].

The process by which the video display controller [21] operates will now be described. Frames are produced continuously by the GPU of a host device and placed in the system frame buffers [22]. This is done irrespective of the action of the rest of the video display controller [21]. The data in the system frame buffers [22] is then fetched into the virtual FIFOs of the first internal buffer [26] by the refill engine [25], which keeps track of the location in each system frame buffer [22] from which it should read. On every clock tick, the refill engine [25] checks if there is space in each virtual FIFO. If one of the virtual FIFOs is not completely full, the refill engine [25] fetches the appropriate data from the system frame buffer [22], increments its pointer and then continues this process for the rest of the frame. Upon reaching the end of the frame, the pointer will reset to the beginning and continue.

The same process is also continuously followed by the refill engines [27, 29] associated with the second internal buffer [28] and the cursor internal buffer [210]. This is also carried out irrespective of the activity of the rest of the video display controller [21] and so neither of these sub-processes is shown in FIG. 4.

Figure 4:
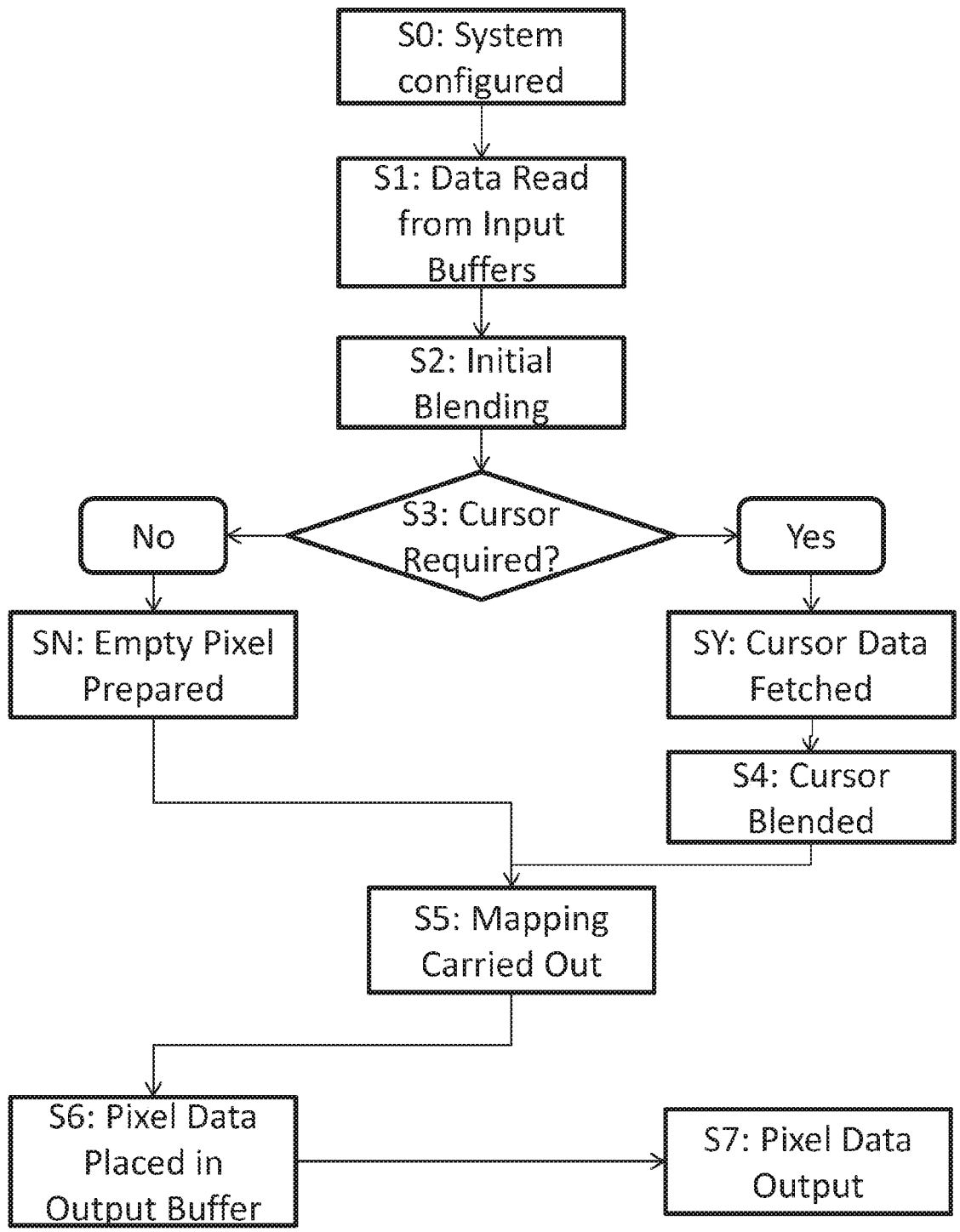
FIG. 4 is a flow diagram illustrating a method of operating the video display controller of FIG. 2 according to one embodiment.

With reference to FIG. 4, at Step S0, the system is configured. This is done for each new frame to be displayed on the display devices [220]. The video display controller [21] is aware that it has finished a frame because it is aware of the position on each display device [220] to which it is writing. The process of configuration includes checking the location of any cursor and therefore on which display device [220] it will be shown (in this embodiment, the cursor may only be shown on one display device; however, this is an example only).

At Step S1, data is read from the internal frame and video buffers [26, 28] according to the instructions of the arbitration system described above. Data from the frame internal buffer [26] and the video internal buffer [28] are then blended by the first combining engine [214], as indicated at Step S2. The control unit [216] also includes control registers which may hold the details of each canvas and its position with regard to the main pixel data. For example, the pixel data in one stream may comprise a prepared background image taken from a frame buffer while the data in a second stream comprises a video overlay. Each stream will have its own canvas on which its data is displayed. The control register associated with this stream will hold the dimensions of the canvas and details of its position such as a set of co-ordinates such that after blending they can be displayed in the correct positions relative to each other on a completed frame.

At Step S3, the video display controller [21] checks if a cursor is required at this point, according to the configuration at Step S0. If so, the cursor data is fetched from the internal cursor buffer [210] via its associated multiplexer [213] in the same way as the other display data, at Step SY. If the cursor is not required, the initially blended display data is passed on at Step SN for further processing at Step S5.

At Step S4, the returned cursor data is blended with the other display data by the cursor blending engine [215], which operates in the same way as the initial blending engine [214]. This will produce a complete frame of display data for each connected display device [220], which in this embodiment is then passed on for further processing at Step S5.

Step S5 comprises mapping the blended display data to the requirements of the appropriate display device [220] and may include colour correction, flipping, mirroring, rotation or any other appropriate mapping function. It is then stored in an output buffer [218], which is divided into multiple FIFOs in a similar way to the input buffers [26, 28, 210], at Step S6. The data may be compressed at this stage.

At Stage S7, the pixel data is fetched by the output interface [219] in a multiplexed single stream, according to identification data [221] supplied directly to the output interface [219]. This identification data allows the output interface [219] to fetch data from the FIFOs of the output buffer [218] in the correct order. Timing data is provided by configuration registers within the control unit [216] which are populated upon connection of the display devices [220], combined with the Horizontal [36] and Vertical [37] synchronisation signals from the timing blocks [35] described above. The timing data and ordering information are then used to create the multiplexed single stream. Finally, the output interface [219] puts the data into packets as appropriate for the transport mechanism in use and transmits it to the display devices [220].

FIG. 5 shows the difference between a conventional, dedicated cursor buffer [52], as shown in FIG. 5(a), in which the cursor data [51] is shown as a hatched area occupying a small amount of the total memory available in the cursor buffer [52], and an embodiment of the present invention shown in FIG. 5(b). In FIG. 5(a) the cursor buffer [52] must be large enough to allow for very large cursors, which means that it is likely most of the space in the cursor buffer [52] will be wasted, as is shown in FIG. 5(a). On the other hand, in FIG. 5(b) the cursor data [51] is stored in a common area of memory, along with standard image data [55]. Other data could also be stored in the common area of memory, but is not here shown. The image data [55] is divided such that one of the blocks shown in FIG. 5(b) comprises the frame buffer [22] associated with each display device, as described above with reference to FIGS. 2 and 3. The cursor data [51] is treated as normal image data while it is held in the common area of memory, except that in this embodiment it is flagged [54] to indicate that it must not be overwritten by other data even if it has not been accessed recently. This is an improvement to normal caching behaviour which will make it more practical to store the cursor data [51] in a common area of memory.

The area of memory flagged [54] in this way can be flexible, making it easier to store different-sized cursors without wasting memory space. In this example, if a large cursor were required, it might take up multiple blocks of memory. The cursor data [51] would be read from the common memory in the same way as if it were being read from a dedicated cursor buffer such as that shown in FIG. 5(a), as described above with reference to FIGS. 2 and 3.

Although only one particular embodiment has been described in detail above, it will be appreciated that various changes, modifications and improvements can be made by a person skilled in the art without departing from the scope of the present invention as defined in the claims. For example, hardware aspects may be implemented as software where appropriate and vice versa. Furthermore, instructions to implement the method may be provided on a computer readable medium.

The invention claimed is:

1. A method of providing display data for at least first and second display devices of a plurality of display devices from a plurality of display data sources, the method comprising:
fetching display data of a first type destined for the first display device from a first portion of a first buffer memory and display data of a second type destined for the first display device from a first portion of a second buffer memory at a first time according to an arbitration control signal, the first buffer memory having stored therein respective display data of the first type for respective display devices in respective portions thereof and the second buffer memory having stored therein respective display data of the second type for respective display devices in respective portions thereof;
combining, by a first combining engine, the fetched display data of the first and second types destined for the first display device into combined display data destined for display on the first display device;

fetching display data of the first type destined for the second display device from a second portion of the first buffer memory and display data of the second type destined for the second display device from a second portion of the second buffer memory at a second time, different to the first time, according to the arbitration control signal;

combining, by the first combining engine, the fetched display data of the first and second types destined for the second display device into combined display data destined for display on the second display device;

time multiplexing the combined display data destined for the first display device with the combined display data for the second display device into a single display data stream; and outputting the single display data stream, wherein the arbitration control signal is generated by:
  generating a virtual clock signal for each particular display device, by:
    receiving a local clock signal, wherein the local clock signal has a frequency that is a, or a multiple of a, sum of clock frequencies required for the plurality of display devices;
    fetching ratio information for the particular display device indicating a ratio between the clock frequency required for the particular display device and the local clock signal;
    counting a fraction of the local clock signal based on the ratio information; and
    outputting the virtual clock signal when the count reaches an integer value,
  using the virtual clock signal by:
    generating a horizontal synchronisation signal to be used to horizontally synchronise the display data on the particular display device;
    generating a vertical synchronisation signal to be used to vertically synchronise the display data on the particular display device; and
    generating an active pixel signal indicating that the display device includes a pixel value to be output, wherein the active pixel signal is used to increment an active pixel accumulator for the particular display device; and
  generating the arbitration control signal based on accumulation totals of each of the active pixel accumulators.

2. The of claim 1, further comprising storing the combined display data for the first display device in a first portion of an output buffer memory prior to the time multiplexing and storing the combined display data for the second display device in a second portion of the output buffer memory prior to the time multiplexing.

3. The method of claim 1, further comprising:
fetching cursor display data destined for the first display device from a first portion of a cursor buffer memory at a first predetermined time according to the arbitration control signal, the cursor buffer memory having stored therein respective cursor display data for respective display devices in respective portions thereof; and
combining, by a second combining engine, the fetched cursor display data destined for the first display device with the combined display data destined for display on the first display device into cursor combined display data destined for display on the first display device.

4. The method of claim 3, further comprising processing the combined data or the cursor combined data prior to the time multiplexing.

5. The method of 4, wherein the processing the combined data or the cursor combined data comprises any one or more of:
flipping, mirroring, rotating, dithering, blending, colour correcting, scaling or other transformations of the display data;
mapping the display data according to requirements of the particular display device for which the display data is destined;
compressing; or
converting into a display specific protocol format for the particular display device for which the display data is destined.

6. The method of claim 3, further comprising:
fetching cursor display data destined for the second display device from a second portion of the cursor buffer memory at a second predetermined time according to the arbitration control signal; and
combining, by the second combining engine, the fetched cursor display data destined for the second display device with the combined display data destined for the second display device into cursor combined display data destined for display on the second display device.

7. The method of claim 1, wherein the single display data stream is demultiplexed into separate display data streams, each separate display data stream being passed to a particular display device.

8. The method of claim 1, wherein the single display data stream is passed to all the display devices, each display device only displaying the display data destined for that display device.

9. The method of claim 1, wherein an accumulation total of a particular active pixel accumulator is reset when display data destined for the particular display device is fetched from a buffer memory based on the arbitration control signal.

10. The method of claim 1, further comprising:
inputting display data of the first type into the first portion of the first buffer memory from a first source of display data of the first type destined for the first display device, and inputting display data of the first type into the second portion of the first buffer memory from a second source of display data of the first type destined for the second display device, each of the sources of display data of the first type having display data of the first type destined for one of the display devices; and
inputting display data of the second type into the first portion of the second buffer memory from a first source of display data of the second type destined for the first display device, and inputting display data of the second type into the second portion of the second buffer memory from a second source of display data of the second type destined for the second display device, each of the sources of display data of the second type having display data of the second type destined for one of the display devices.

11. The method of claim 10, further comprising decompressing the display data prior to inputting it into a buffer memory if a source of the display data provides it in compressed form.

12. The method of claim 1, wherein the first type of display data comprises image data.

13. The method of claim 1, wherein the second type of display data comprises video overlay data.

14. A video display controller configured to perform:
fetching display data of a first type destined for the first display device from a first portion of a first buffer memory and display data of a second type destined for the first display device from a first portion of a second buffer memory at a first time according to an arbitration control signal, the first buffer memory having stored therein respective display data of the first type for respective display devices in respective portions thereof and the second buffer memory having stored therein respective display data of the second type for respective display devices in respective portions thereof;
combining, by a first combining engine, the fetched display data of the first and second types destined for the first display device into combined display data destined for display on the first display device;
fetching display data of the first type destined for the second display device from a second portion of the first buffer memory and display data of the second type destined for the second display device from a second portion of the second buffer memory at a second time, different to the first time, according to the arbitration control signal;
combining, by the first combining engine, the fetched display data of the first and second types destined for the second display device into combined display data destined for display on the second display device;
time multiplexing the combined display data destined for the first display device with the combined display data for the second display device into a single display data stream; and
outputting the single display data stream,
wherein the video display controller configured to generate the arbitration control signal by:
generating a virtual clock signal for each particular display device, by:
receiving a local clock signal, wherein the local clock signal has a frequency that is a, or a multiple of a, sum of clock frequencies required for the plurality of display devices;
fetching ratio information for the particular display device indicating a ratio between the clock frequency required for the particular display device and the local clock signal;
counting a fraction of the local clock signal based on the ratio information; and
outputting the virtual clock signal when the count reaches an integer value,
using the virtual clock signal by:
generating a horizontal synchronisation signal to be used to horizontally synchronise the display data on the particular display device;
generating a vertical synchronisation signal to be used to vertically synchronise the display data on the particular display device; and
generating an active pixel signal indicating that the display device includes a pixel value to be output, wherein the active pixel signal is used to increment an active pixel accumulator for the particular display device; and
generating the arbitration control signal based on accumulation totals of each of the active pixel accumulators.

15. The video display controller of claim 14, further configured to perform:
fetching display data from the buffer memories according to the arbitration control signal;
receiving the fetched display data and combining the fetched display data of different types for each of the plurality of display devices;
receiving the combined display data for each of the display devices from the first combining engine and multiplexing the combined display data destined for different display devices into a single display data stream; and
generating the arbitration control signal.

16. The video display controller of claim 15, further configured to perform combining the combined display data with the cursor display data.

17. The video display controller of claim 14, further comprising a plurality of sources of display data of different types.

18. The video display controller of claim 14, further configured to perform:
fetching cursor display data destined for the first display device from a first portion of a cursor buffer memory at a first predetermined time according to the arbitration control signal, the cursor buffer memory having stored therein respective cursor display data for respective display devices in respective portions thereof; and
combining, by a second combining engine, the fetched cursor display data destined for the first display device with the combined display data destined for display on the first display device into cursor combined display data destined for display on the first display device.

19. The video display controller of claim 18, further configured to perform:
fetching cursor display data destined for the second display device from a second portion of the cursor buffer memory at a second predetermined time according to the arbitration control signal; and
combining, by the second combining engine, the fetched cursor display data destined for the second display device with the combined display data destined for the second display device into cursor combined display data destined for display on the second display device.

* * * * *